(No Model.) 3 Sheets—Sheet 1.

T. ROGERS.
LAWN MOWER.

No. 391,193. Patented Oct. 16, 1888.

Attest:
F. Willis Baines
Chase Stewart

Inventor:
Timothy Rogers
By [signature]
Atty.

(No Model.) 3 Sheets—Sheet 2.

T. ROGERS.
LAWN MOWER.

No. 391,193. Patented Oct. 16, 1888.

Attest:
T. Willis Gaines.
Chase Stewart.

Inventor:
Timothy Rogers.
By Paul A. Staley
Atty.

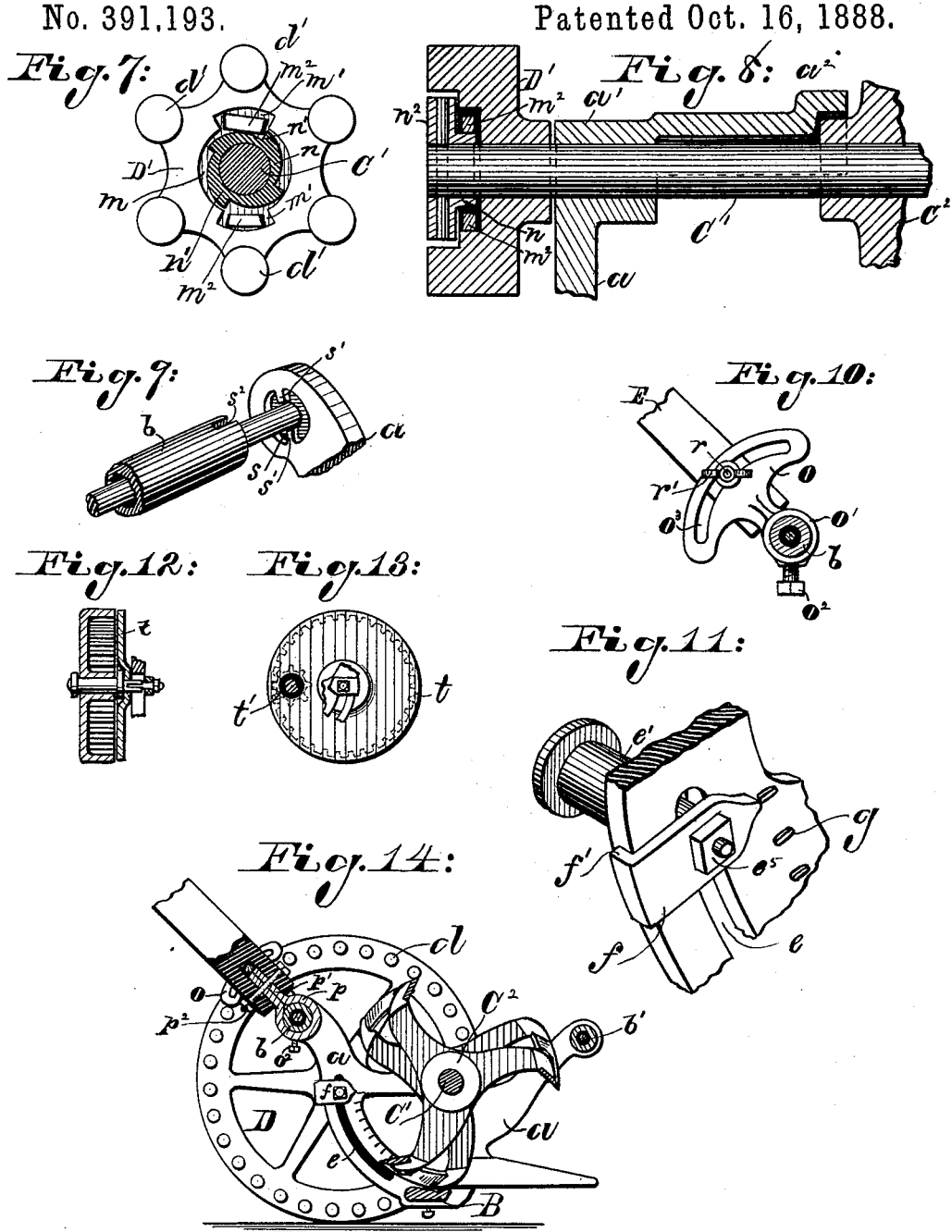

United States Patent Office.

TIMOTHY ROGERS, OF SPRINGFIELD, OHIO, ASSIGNOR, BY MESNE ASSIGNMENTS, TO WILLIAM BURNS, OF SAME PLACE.

LAWN-MOWER.

SPECIFICATION forming part of Letters Patent No. 391,193, dated October 16, 1888.

Application filed February 25, 1886. Serial No. 193,257. (No model.)

*To all whom it may concern:*

Be it known that I, TIMOTHY ROGERS, a citizen of the United States, residing at Springfield, in the county of Clark and State of Ohio, have invented certain new and useful Improvements in Lawn-Mowers, of which the following is a specification.

My invention relates to improvements in lawn-mowers; and it consists in various constructions and combinations of parts, hereinafter described and claimed.

Figure 1:
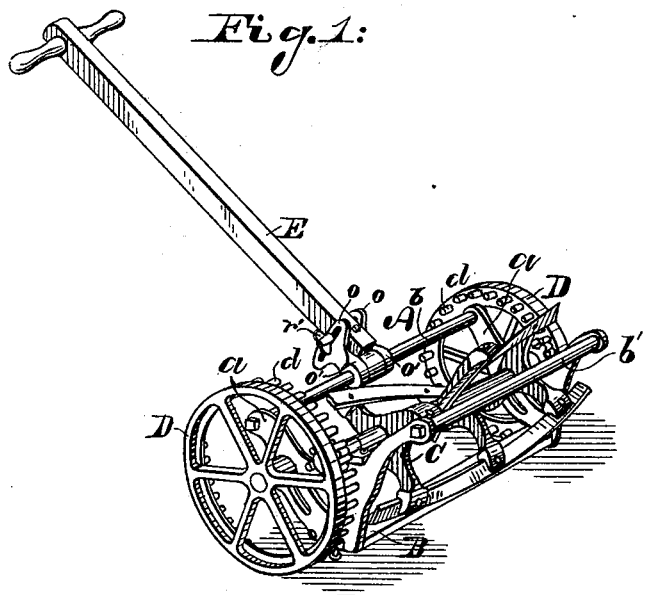
Figure 2:
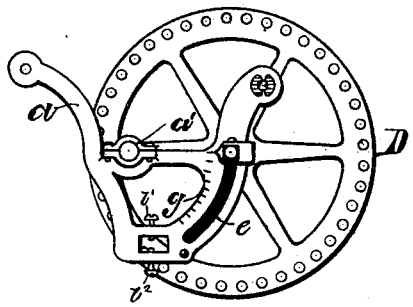
Figure 3:
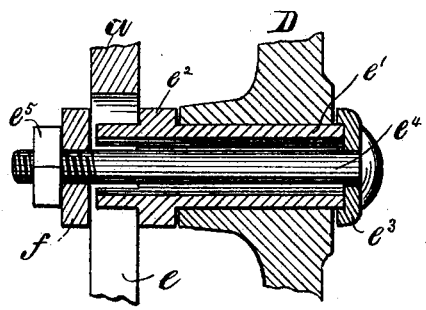
Figure 4:
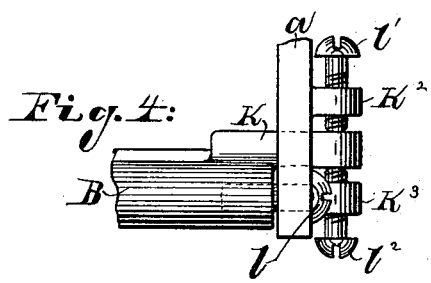
Figure 5:
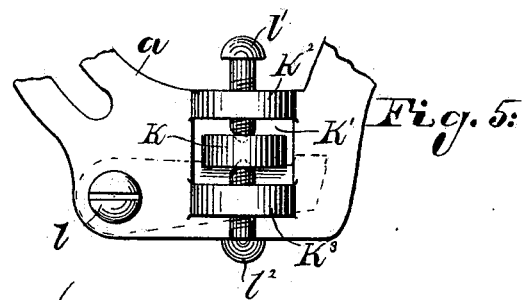
Figure 6:
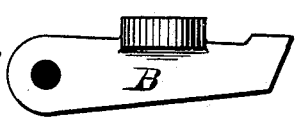
Figure 15:
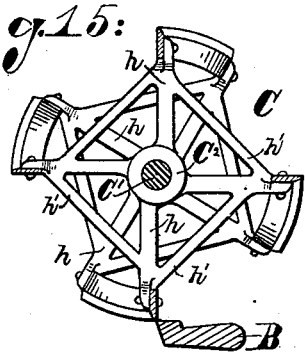
Figure 16:
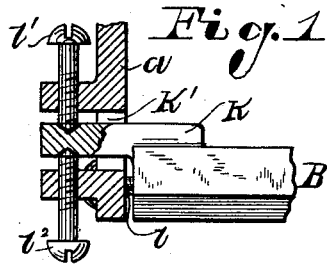
Figure 17:
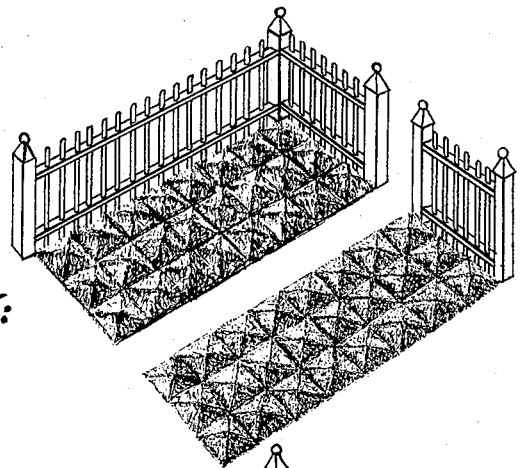
Figure 18:
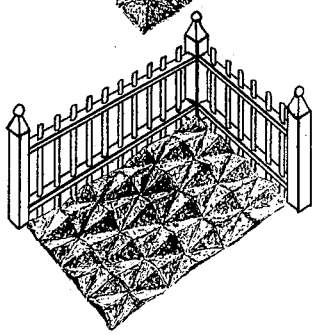

In the accompanying drawings, which form a part of this specification, Figure 1 is a perspective view of a machine embodying my invention. Fig. 2 is a detailed view of one end of the frame, showing the manner of attaching the wheels thereto. Fig. 3 is a sectional view of the wheel-supporting stud in detail. Figs. 4, 5, and 6 are detailed views showing the manner of securing the ends of the fixed cutter and the means of adjusting the same. Figs. 7 and 8 are detailed views in section, showing the driving-pinions and clutch mechanism, together with the reel-shaft bearing. Fig. 9 is a detailed view of the sleeve to which the handle is attached, showing the manner of connecting the same to the frame. Fig. 10 is a view showing the handle attachment and adjusting mechanism. Fig. 11 is a detailed view, in perspective, of the wheel-supporting stud and the means for connecting same to the frame, and showing the graduations for adjusting said wheel and stud. Figs. 12 and 13 are respectively a transverse section and a side elevation of a modified form of driving-wheel. Fig. 14 is a transverse sectional view of the machine. Fig. 15 is an elevation view of a modified form of the cutting-reel. Fig. 16 is a sectional view of the end of the fixed cutter in detail, showing the manner of adjusting the same. Figs. 17 and 18 are views illustrating the work performed by my improved machine.

Like parts are indicated by similar letters of reference throughout the several views.

In the said drawings, A represents the main frame, B the fixed cutter, and C the reel.

The frame A is composed of two end pieces, $a\ a$, which are connected together at the top by connecting-rods $b\ b'$, at the front and rear respectively, and at the bottom by the fixed cutter B, as hereinafter more fully described.

The main frame A is supported at either end by carrying and driving wheels D D, from which the power to drive the reel C is derived. The power to drive the reel is transmitted from the driving-wheels D D by a series of projections or teeth, $d$, which engage with similar projections, $d'$, on pinions D' on the respective ends of the reel-shaft C'. The reel-shaft C' is supported at either end in suitable bearings, $a'$, on the respective end pieces, $a$. The reel is provided in the usual way with the spiral-shaped blades, which as the reel is revolved pass in a shearing manner over the fixed cutter to do the cutting.

In order to provide for cutting the grass at differents heights, I provide means for adjusting the frame vertically in relation to the carrying-wheels. This I preferably accomplish as follows: In each of the end pieces, $a$, I provide a slotted opening, $e$, which is formed on an arc of a circle having its center at the center of the reel shaft bearing $a'$. The driving-wheels are each supported on a sleeve, $e'$, adapted at one end to be inserted into the slot $e$, and also provided with a collar, $e^2$. Fitting on the outer end of the sleeve is a washer, $e^3$, through which passes a bolt, $e^4$. This bolt $e^4$ extends entirely through the sleeve and slot, and is adapted at its outer end to pass through a bearing and marking piece, $f$, on the inside of the end piece, $a$. (See Figs. 3 and 11.) The wheel D is slipped on the sleeve $e'$ and the washer $e^3$ placed on the end of said sleeve. The bolt $e^4$ is then passed through the washer and sleeve, after which the end of the sleeve is inserted in the slot, the end of the bolt projecting through said slot. The marking-piece $f$ is then slipped on the bolt and the whole secured tightly together by screwing the nut $e^5$ on the bolt $e^4$.

The end pieces, $a$, are provided on the inside, next to the slot $e$, with a series of marks or graduations, $g$, preferably cast thereon. The marking-piece $f$, which is secured on the bolt $e^4$, is pointed at one end and provided at the other end with a flange, $f'$. This flange is adapted to extend over and rest against the edge of the end piece, $a$, of the frame, which at this point is formed on the arc of a circle concentric with the slot $e$. The marking-piece $f$ is thus free to move along the slot $e$, and forms a guiding-face for the said flange $f'$ as the sleeve is moved in said slot, but is held at all times at right angles across said slot by the flange $f'$ and its guiding-face. The pointed end of the marker is thus brought opposite the graduations $g$ as the sleeve carrying the wheel D is moved along the slot.

The sleeve $e'$ from the collar $e^2$ outward is made a little longer than the hub of the driving-wheel, and from the said collar inward is made a little shorter than the thickness of the metal at the sides of the slot $e$. As the nut $e^5$ therefor is tightened on the bolt $e^4$ the washer $e^3$ is drawn tightly against the end of the sleeve and the said sleeve is held securely at any desired point in said slot, while the wheel D is free to turn thereon. The washer $e^3$ is preferably recessed on its under side to fit over the end of the sleeve, as shown in Fig. 3.

I preferably construct the reel C so that the front edges of the blades thereof are on a radial line from the center of the reel-shaft, as shown in Fig. 15. By this construction less grinding is required to sharpen the knife than when the blades are placed tangential, as shown in Figs. 1 and 14.

In order to secure strength and lightness combined with efficiency in cutting, I construct the reel-spiders $C^2$ with arms $h$, the front sides of which are extended from the hub in radial lines. These arms are connected together by bracing-strips $h'$, which are preferably cast integral therewith. By this construction the reel is made quite light, and at the same time very strong. The spiders $C^2$ will be preferably cast in malleable iron. The blades will be preferably made of steel and placed spirally thereon in the usual manner, so as to secure a shearing motion in relation to the fixed cutter B.

The fixed cutter B, I preferably make of cast-iron, the front or cutting edge thereof being cast with a chill. In order to secure the fixed cutter firmly in place in the frame A, and at the same time to provide for readily adjusting it in relation to the reel, I provide the bar at either end with lugs K K, which are adapted to be inserted through openings K' in the end pieces, $a$, on either side of which are projecting lugs $K^2$ $K^3$. The bar is secured at the rear to the end frame-pieces, $a$, by screws $l$, which pass through the said frame-piece and screw into the ends of the said bar, thus forming pivots on which the bar is adapted to oscillate. Extending vertically through the lugs $K^2$ $K^3$ from the top and bottom, respectively, are adjusting-screws $l'$ $l^2$. These screws are preferably pointed at the ends and adapted to enter conical-shaped depressions in the top and bottom, respectively, of the lugs K on the fixed cutter. It will be readily seen that by loosening the screws $l$ at the rear and turning the respective screws $l'$ $l^2$ up or down the front or cutter edge of the fixed cutter may be readily and accurately adjusted in relation to the reel C.

As above stated, the power from the driving-wheels D is transmitted to the reel-shaft C' by means of projections $d$ on the wheels engaging with similar projections, $d'$, on the pinions D' on the reel-shaft. The projections I make in the nature of pins, preferably round and of equal diameter, the pins in the wheel being adapted to come between those in the pinions. By this construction the power is readily transmitted from the wheels to the pinions without danger of clogging from the cut grass, as is the case with common gears when used for this purpose.

In order that the driving-wheels may be capable of backward and forward motion while the reel runs only in a forward direction, I provide in each of the pinions D' a clutch adapted to become engaged, and thus connect the pinion with the reel-shaft when the pinions are revolved in a forward direction only, the pinions being free to revolve backwardly without engaging said clutches. I preferably accomplish this by providing each of the pinions with an annular recess, $m$, into which a ratchet-collar, $n$, on the shaft C' is adapted to extend. On either side of the annular recess $m$ is a notch or depression, $m'$, adapted to receive a small gravity-pawl, $m^2$, which is laid loosely therein. The pinion turns loosely on the shaft. The ratchet-collar, however, is pinned fast to the shaft, and is provided with one or more notched teeth, $n'$, adapted to engage with the pawls $m^2$ as the pinion is revolved in one direction, and adapted to force said pawls into the notches $m'$ when the pinion is revolved in the opposite direction. The notched collar $n$ is provided at its outer end with an annular flange, $n^2$, which bears against the end of the pinion D' and extends outwardly sufficiently to cover the notches $m'$, and thus completely incase the clutch mechanism.

The end pieces, $a$ $a$, of the frame are connected together by the connecting-pieces $b$ $b'$. Each of these connecting-pieces consists of a pipe or sleeve, which rests at either end against the inside of the end pieces, and a bolt or rod, which passes through said end pieces and sleeve, and is provided at one end with a suitable head and at the other with a screw-nut, by which the parts may be tightly clamped together. To the rear connecting piece, $b$, I attach the handle E, to which the power to drive the machine is applied. Now, in order to accommodate the handle to persons of different heights, and at the same time to provide for tilting the machine to vary the height of the cut, I so attach the handle E to the connecting-piece $b$ that it will be capable of a vertical oscillating adjustment thereon. This I do as follows: On the connecting-sleeve $b$, near the center, I place two quadrant-shaped side pieces, $o$ $o$. Each of these pieces is provided with a circular boss, $o'$, which is bored out to fit the connecting-sleeve $b$, and is provided with a set-screw, $o^2$, by which it is adapted to be held from turning on said sleeve. In the outer ends of the quadrant-shaped pieces o are slotted openings $o^3$, formed on an arc of a circle whose center is at the center of the connecting-sleeve b. Between the side pieces, o o, on the sleeve b, and held against longitudinal movement thereon by the circular bosses $o'$, is a connecting-strap, p, which encircles the sleeve at one end and is provided at the other with a projecting leaf, $p'$, to which the handle E is attached.

The handle E is slotted at its lower end and adapted to slip over the projecting leaf $e'$, and is secured thereto by a bolt, $p^2$, which passes through said handle and connecting-strap. The slot in the lower end of the handle is made sufficiently long so that a space or opening is left at the end of the strap large enough to receive a bolt, r, which passes through the slotted opening $o^3$ and the handle E, and is provided with a thumb nut, $r'$, (see Figs. 1, 10, and 14 for detail,) which, when tightened, is adapted to hold the handle in any position of adjustment in the slotted openings $o^3$. The side pieces, o, are secured to the sleeve b by set-screws $o^2$. The connecting strap p, however, is free to turn thereon.

By loosening the thumb nut $r'$ the handle may be turned to any desired adjustment and then secured again by tightening the thumb-nut on the bolt r.

It will be seen that the handle E may thus be readily turned to and secured in any desired position of adjustment along the slotted quadrant side pieces, o o.

To prevent the turning of the sleeve b, and thus secure the tilting of the machine when the handle is raised or lowered, I provide the end pieces, a, on their inner sides with countersunk recesses s, into which the ends of the sleeve are adapted to enter. Each of these recesses is provided with small lugs or projections $s'$, adapted to fit into notches $s^2$ in the ends on the sleeve b. The sleeve b is thus securely held from turning, so that a tilting motion of the handle is transferred directly to the fixed cutter.

The connecting-sleeves b and $b'$, I preferably make of gas-pipe, the end pieces, a, being preferably made of malleable iron. The bearing-sleeves e, on which the driving-wheels are supported, are preferably cast with a chill, the hole through the driving-wheels which fits over said sleeves being also chilled to form a bearing-surface, so that all turning or fitting of the parts is obviated. Each of the bearings $a'$, in which the shaft $C'$ turns, is preferably provided with a shield, $a^2$, which extends along the shaft $C'$ and over the hub of the spider $C^2$, thus forming a cover which prevents the cut grass from falling on and winding around the shaft, and at the same time forming a stop to prevent the reel from moving longitudinally through its bearings.

The driving-wheels being adjustable with the frame A, the machine may be readily adjusted to cut grass of different lengths.

Each wheel being capable of an independent adjustment, one side of the machine may be lowered and the other raised, so as to cut the grass at an angle. By this adjustment the mower may be rendered capable of artistic mowing in various designs. For example, by setting the mower at an angle and cutting two swaths across a lawn or plot in opposite directions a ridge of grass may be left which shall slope gradually up on one side equal to the width of the mower and down on the other. By crossing the ridges at an angle to each other these ridges may be reduced to squares or diamonds, as illustrated in Figs. 17 and 18. In this way an almost endless variety of artistic lawn-mowing may be performed.

In Figs. 12 and 13 I have shown a modified form of driving-wheels. In this form the driving-wheels are made with a solid periphery which projects out over the pins or teeth d. A circular disk, t, a little smaller in diameter than the driving-wheel, is secured on the sleeve e between the shoulder $e^2$ and the frame-piece $a'$. This disk t is provided with an opening, $t'$, for the shaft $C'$, which extends through said disk, the pinion $D'$ being between the disk and the driving-wheel. The outer edge of the disk bears against the face of the driving-wheel, and thus completely incases said pinion.

It is evident that various other modifications may be employed without departing from the spirit of my invention.

Having thus described my invention, I claim—

1. In a lawn-mower, the end piece having a bearing for the reel-shaft and for the fixed cutter, said reel-shaft being extended through said bearing and provided with a pinion adapted to engage directly with the gear on the carrying-wheel, a slotted opening in the end piece, formed on the arc of a circle struck from the center of said reel-shaft, a stud or journal on which said carrying-wheel is adapted to turn, located in said slotted opening, and means, substantially as described, for securing said stud at different points therein, as set forth.

2. A main frame for a lawn-mower, consisting of end pieces, each provided with a bearing for the reel-shaft and the fixed cutter, said reel-shaft being extended through said end pieces and provided with pinions which engage with gear-teeth on the carrying-wheels, slotted openings in each of said end pieces, each formed on the arc of a circle having as its center the center of said reel-shaft, journals for supporting said carrying-wheels, located in said slotted openings, means, substantially as described, for securing said journal at different points therein, marking-pieces on said journals, and graduations on said end pieces, substantially as and for the purpose set forth.

3. The combination, with the end pieces having slots therein and graduations adjacent to said slots, of a sleeve having a collar, $e^2$, in each of said slots, a cap on the end of said collar, a fastening-bolt passing through said sleeve, and a marker on said bolt, substantially as and for the purpose set forth.

4. The combination, with the end piece having a slotted opening therein and a guiding-face concentric with said slotted opening, a journal for the carrying-wheel, located in said slotted opening, a fastening-bolt for securing said journal in different positions, graduations adjacent to said slotted opening, and a marking-piece on said fastening bolt, said marking-piece being provided with a projecting flange adapted to bear on said guiding-face, substantially as set forth.

5. The combination, with the main frame, consisting of the end pieces having bearings for the reel-shaft and the fixed cutter, the reel-shaft extended through said bearings, and provided with pinions which engage with the gear on the carrying-wheels, the slotted openings in each of said end pieces, formed on an arc of a circle having its center at the center of said reel-shaft, adjustable driving-wheels supported upon journals in said slotted openings, marking-pieces having the guiding-flanges and adapted to mark the adjustment of said driving-wheels, and graduations adjacent to said marking-pieces, substantially as set forth.

6. The combination, with the main frame of the end pieces, each provided with a recess, $s$, and a projection, $s'$, of a connecting-sleeve adapted to fit over said projections, means, substantially as described, for securing said sleeve to said end pieces, the slotted side pieces secured by set-screws to said sleeves, a handle connected to said sleeve by a strap, and a thumb-bolt passing through said side pieces and handle, substantially as and for the purpose set forth.

In testimony whereof I have hereunto set my hand this 20th day of February, A. D. 1886.

TIMOTHY ROGERS.

Witnesses:
PAUL A. STALEY,
F. WILLIS BAINES.